United States Patent [19]
DeLuca et al.

[11] 3,922,235
[45] Nov. 25, 1975

[54] STABILIZED RUTHENIUM CATALYSTS FOR SELECTIVE REDUCTION OF OXIDES OF NITROGEN

[75] Inventors: John P. DeLuca, New Providence; Lawrence L. Murrell, Elizabeth; Richard P. Rhodes, Westfield; Samuel J. Tauster, Englishtown, all of N.J.

[73] Assignee: Exxon Research & Engineering Co., Linden, N.J.

[22] Filed: July 31, 1974

[21] Appl. No.: 493,329

[52] U.S. Cl. .............................. 252/472; 423/213.5
[51] Int. Cl.² .................... B01J 21/06; B01J/23/46
[58] Field of Search................... 252/472; 423/213.5

[56] References Cited
UNITED STATES PATENTS

| 3,370,914 | 2/1968 | Gross et al. ............... 423/213.5 |
| 3,784,675 | 1/1974 | Kobylinski et al. .......... 423/213.5 |
| 3,809,743 | 5/1974 | Unland et al. .............. 423/213.5 |
| 3,842,017 | 10/1974 | Armistead et al. .......... 252/472 X |

*Primary Examiner*—W. J. Shine
*Attorney, Agent, or Firm*—Joseph J. Allocca

[57] ABSTRACT

A $NO_x$ reduction catalyst is described. The catalyst consists of ruthenium interacting with a support of either zirconium titanate, titania or mixtures thereof. The new catalyst results in a stabilized ruthenium catalyst that is resistant to both ruthenium volatilization loss and ruthenium sintering.

5 Claims, No Drawings

STABILIZED RUTHENIUM CATALYSTS FOR SELECTIVE REDUCTION OF OXIDES OF NITROGEN

BACKGROUND OF THE INVENTION

This invention relates to the selective removal of nitrogen oxides in the exhaust gases from internal combustion engines. In one aspect, this invention relates to the selective removal of nitrogen oxides in the exhaust gases from internal combustion engines without the formation of significant amounts of ammonia. In another aspect, this invention relates to using a stabilized supported ruthenium as the catalyst.

Over the past few years, considerable research effort has been expended to discover means for the removal of nitrogen oxides in the exhaust gases from internal combustion engines. Charles E. Thompson in his U.S. Pat. No. 3,637,344 discloses a ruthenium-iridium catalyst to remove objectionable products from the exhaust gases of internal combustion engines by contacting the exhaust gas therewith. Howk et al in U.S. Pat. No. 3,316,057 discloses the treatment of exhaust gases of internal combustion engines with a catalyst to effect reduction of nitrogen oxides and then with added air contacted with the catalyst to effect oxidation. Gross et al in U.S. Pat. No. 3,370,914 disclose utility of a ruthenium catalyst in the absence of added air to effect reduction of nitrogen oxides in exhaust gases from internal combustion engines. Houdry in U.S. Pat. No. 2,747,976 and Calvert in U.S. Pat. No. 3,168,806 each disclose the utility of ruthenium as a catalyst to effect the oxidation of oxidizable constituents in exhaust gases of internal combustion engines.

Recently, Kobylinski et al have disclosed in U.S. Pat. No. 3,784,675 that they have discovered that by using ruthenium within specific critical ranges, the concentration of oxygen in an automobile exhaust gas mixture has, in fact, no adverse effect on the desired conversion of all the nitrogen oxides to nitrogen and that oxygen can be tolerated provided that the stoichiometric ratio of molecular oxygen to reducing agents, which ratio defines the reducing atmosphere herein, is maintained below 1:1.

In the subject application, the applicants have discovered a way to stabilize the ruthenium by placing it on a specific support so that it remains stable in an oxidizing atmosphere as well as in a reducing atmosphere. Since automobiles tend to be operted over a range of both rich conditions, i.e. high fuel, low oxygen and lean conditions, i.e. low fuel, high oxygen, this has been a principal hindrance to the practical utilization of supported ruthenium catalysts for the catalytic removal of $NO_x$ from automotive exhaust gases. It is well known in the prior art that ruthenium tends to form volatile oxides such as $RuO_3$ and $RuO_4$ at high temperatures and in the presence of oxygen.

We have now found that by enploying a support selected from one of the groups consisting of (a) zirconium titanate, (b) titania, or (c) mixtures of titania and zirconium titanate present in any molar ratios between the titania and zirconium titanate, the loss of ruthenium is significantly reduced so that it is operable and durable over the broad range of conditions to which the catalyst would be subjected in automobile exhausts.

The prior art has listed titania and zirconia as suitable supports for ruthenium; however, nowhere does it suggest, show or teach the specific application of the above-identified supports or their binary compounds for stabilizing ruthenium in its employment as a catalyst for removal of $NO_x$ from automotive exhaust gases.

The gas mixtures of interest for treatment in accordance with the catalyst of this invention are those gas mixtures produced by the combustion of a hydrocarbon fuel using air, such as the exhaust gases from the internal combustion engine utilizing a hydrocarbon-type fuel. By an internal combustion engine we mean to include an engine having a combustion chamber wherein a hydrocarbon fuel is burned with molecular oxygen, and the products of combustion are used to drive moving parts such as the piston rotors, etc. The hydrocarbon fuels normally consist of 5–15 volume percent naphthenes, 25–35 volume percent paraffins and 50–60 volume percent aromatic hydrocarbons.

Any suitable method well known to those having an ordinary skill in the art can be employed in the preparation of the ruthenium catalyst supported on titania, zirconium titanate or mixtures of titania and zirconium titanate. For example, the ruthenium can be deposited on the aforementioned support by contacting the support with an aqueous solution of ruthenium chloride at room temperature and room pressure for a suitable period of time, for example, about 6 hours. The catalyst can then be dried, reduced and calcined in the usual manner, for example, dried for 6 hours at 200°F and then reduced in hydrogen for 2 hours at 1000°F after which it is ready for use in the process defined herein. Under conditions met under conventional automotive use, some Ru loss will be observed until stabilization is achieved. This initial loss during operation can be prevented by a high temperature treatment prior to use at a temperature of at least 1550°F in air.

Any suitable method well known to those having an ordinary skill in the art can be employed in the perparation of zirconium titanate. For example, the correct stoichiometric ratio (defined as one zirconium atom to one titanium atom) of titanium-iso-propylate [Ti-$(OC_3H_7)_4$] and zirconium-n-propoxide [$Zr(OC_3H_7)_4$] are mixed together with 4 times their weight of toluene. This mixture is stirred and 3 times the stoichiometric amount of water is added to cause the titanium and zirconium to hydroxalate and then precipitate. The solid and liquid are then separated and the solid is then heated to 1650°F. in air for 16 hours to form a single phase oxide, zirconium titanate.

The reaction conditions which are employed in the selective reduction of a nitrogen oxide using the ruthenium catalyst of this invention are important in order to obtain a product wherein nitrogen is substantially the only nitrogen containing product. The conditions in the reaction zone should be carried forth at a temperature ranging from 300°F to about 1600°F and preferably, from about 800°F to about 1500°F.

As mentioned above, the catalyst is exposed (during normal engine operation) intermittently to conditions of excess oxygen (i.e., lean engine operation) followed by more normal reducing conditions (i.e., rich engine operation). Especially during these transient excursions into lean operation a stabilized ruthenium catalyst is needed. The ruthenium, during these lean operating conditions, must react with the support in a very special way so as to (1) prevent volatilization loss via $RuO_3$ and/or $RuO_4$, (2) retard sintering of ruthenium and (3) be readily available for $NO_x$ reduction again when the engine switches back to net rich operation.

The amount of ruthenium which can be stabilized on zirconium titanate, titania, or mixtures thereof, is not greater than .003 grams of ruthenium per gram of interacting oxide support and preferably from 0.00005 to .001 grams of ruthenium per gram of interacting oxide support.

In addition to being able to interact with the support in such a manner so as to substantially reduce ruthenium volatilization, the support must have certain special thermal, mechanical and chemical properties. The supports must not undergo any easily reversible phase changes, the support must not be able to be reduced in the engine exhaust gases, the support has to maintain a reasonable surface area at engine operating temperatures and the supports have to have good thermal shock resistance due to the rapid heating and cool-down it is subjected to during its life. The supports of the present invention meet these stringent requirements.

By operating the process as defined herein, substantially all the nitrogen oxides are converted to nitrogen and water, and only a small amount thereof is converted to ammonia.

The reaction pressure is not critical and suitable pressures range from 0 to 150 pounds per square inch gauge with the preferred pressure being atmospheric or slightly above. It has also been found that ruthenium supported upon zirconium titanate, titania or mixtures thereof is an excellent catalyst at both low and high gas hourly space velocity (GHSV) i.e. at 8,000 to about 200,000 or even higher, volumes of gas per hour per total volume of catalyst. In general, we prefer to operate at space velocities of about 10,000 to about 90,000. Here, as elsewhere in the specification, volumes are defined as being at standard conditions, that is, 760 mm Hg and 0°C.

The invention will be further described with reference to the following experimental work, wherein the criticality of the ruthenium supported upon the zirconium titanate or titania or mixtures thereof is compared with the conventional ruthenium/alumina catalyst systems disclosed in the prior art patents.

EXAMPLE 1

A 1 gram sample of titanium oxide having a surface area of 10 m$^2$ per gram was impregnated with 0.0009 grams of ruthenium from an aqueous ruthenium chloride solution, dried 400°F and then reduced 1000°F in hydrogen for 2 hours. The catalyst was subjected 1550°F for 64 hours to flowing wet air. After this treatment, it was found by chemical analysis that 33% of the ruthenium was lost from the support, prior to its being stabilized against any further loss. The catalyst showed 89% selective NO$_x$ reduction at 600°C.

EXAMPLE 2

A 1 gram sample of zirconium titanate having a surface area of 40 m$^2$ per gram was impregnated with 0.0009 grams of ruthenium from an aqueous ruthenium chloride solution, dried 400°F and then reduced 1000°F in hydrogen for 2 hours. The catalyst was subjected 1550°F for 64 hours to flowing wet air. After this treatment, it was found by chemical analysis that 31% of the ruthenium was lost from the support prior to its being stabilized against any further loss. The catalyst showed 85% selective NO$_x$ reduction at 600°C.

EXAMPLE 3

A 1 gram sample of alumina having a surface area of 90 m$^2$ per gram was impregnated with 0.001 grams of ruthenium from an aqueous ruthenium chloride solution, dried and then reduced 1000°F in hydrogen for two hours. The catalyst was then subjected 1550°F for 64 hours to flowing wet air. After this treatment, it was found by chemical analysis that all of the ruthenium had been lost from the support. This catalyst was thus completely inactive for NO$_x$ reduction.

EXAMPLE 4

A 1 gram sample of titanium oxide having a surface area of 10 m$^2$ per gram was impregnated with 0.0009 grams of ruthenium from an aqueous ruthenium chloride solution, dried 400°F and then reduced 1000°F in hydrogen for 2 hours. This catalyst was then subjected 1550°F for 64 hours to intermittent hydrogen, wet air atmospheres. This cycling was to simulate an internal combustion engine. After this treatment, a chemical analysis showed that 14% of the ruthenium had been lost from the titanium oxide support prior to its being stabilized against any further loss. The catalyst showed 88% selective No$_x$ reduction 1100°F.

EXAMPLE 5

A 1 gram sample of zirconium titanate having a surface area of 40 m$^2$ per gram was impregnated with 0.0009 grams of ruthenium from an aqueous ruthenium chloride solution, dried 400°F and then reduced 1000°F in hydrogen for 2 hours. This catalyst was then subjected 1550°F for 64 hours to intermittent hydrogen, wet air atmospheres. This cycling was to simulate an internal combustion engine. After this treatment, a chemical analysis showed that 60% of the ruthenium had been lost from the zirconium titanate support prior to its being stabilized against any further loss. The catalyst showed 88% selective NO$_x$ reduction 1100°F.

EXAMPLE 6

A 1 gram sample of alumina having a surface area of 90 m$^2$ per gram was impregnated with 0.001 grams of ruthenium from an aqueous ruthenium chloride solution, dired 400°F and then reduced 1,000°F in hydrogen for two hours. This catalyst was then subjected 1550°F for 64 hours to intermittent hydrogen, wet air atmospheres. This cycling was to simulate an internal combustion engine. After this cycling treatment, a chemical analysis showed that all the ruthenium had been lost from the alumina support, the catalyst was thus completely inactive for NO$_x$ reduction. What is claimed is:

1. A stabilized supported ruthenium catalyst, said catalyst comprising ruthenium metal in combination with an oxide support, said support being one selected from the group consisting of zirconium titanate, and zirconium titanate mixed with titania, the ruthenium being present in an amount which does not exceed 0.003 grams of ruthenium per gram of oxide suport.

2. A catalyst according to claim 1 wherein the ruthenium is present in an amount ranging from 0.00005 to 0.001 grams of ruthenium per gram of interacting oxide support.

3. A catalyst according to claim 1 wherein the support is zirconium titanate.

4. A catalyst according to claim 1 wherein the support is a mixture of zirconium titanate and titania in any molar ratio between the titania and zirconium titanate.

5. A method for forming a stabilized supported ruthenium catalyst, said method comprising the steps of contacting a support, said support being one selected from the group consisting of zirconium titanate and zirconium titanate mixed with titania with an aqueous solution of a ruthenium salt present in an amount to deposit upon the support an amount of metal no greater than .003 grams of ruthenium per gram of support under ambient temperature and pressure conditions, drying the catalyst, then reducing the catalyst in a hydrogen atmosphere at 1000°F. and calcining the catalyst in air at a temperature of at least 1550°F.

* * * * *